Oct. 4, 1955

F. ERNEST 2,719,767

PISTON RING STRUCTURE

Filed April 12, 1952

INVENTOR.
FRED ERNEST
BY
John Flam
ATTORNEY.

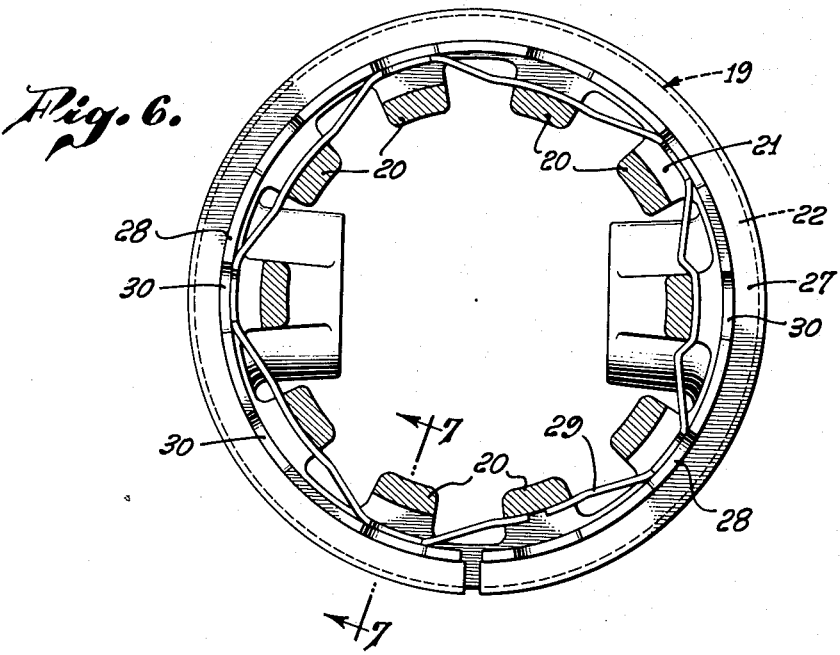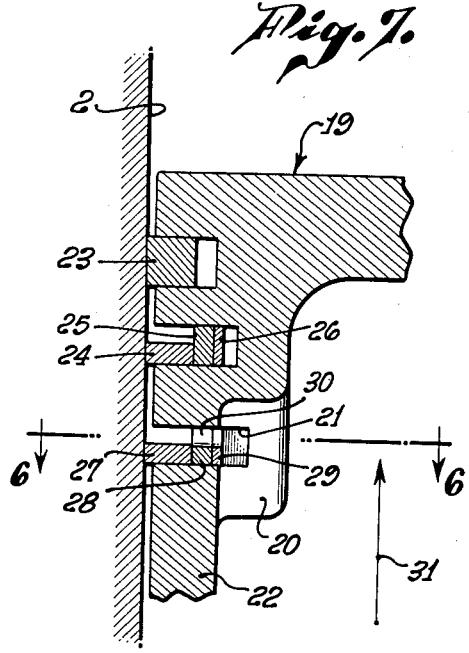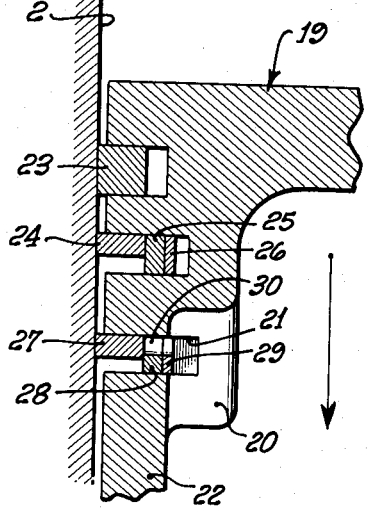

Oct. 4, 1955  F. ERNEST  2,719,767
PISTON RING STRUCTURE
Filed April 12, 1952  3 Sheets-Sheet 3
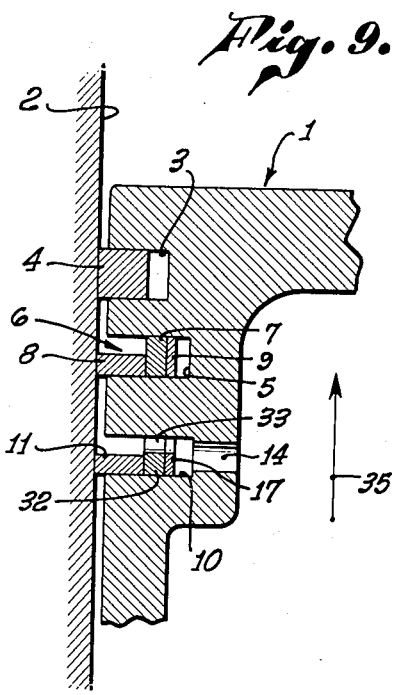
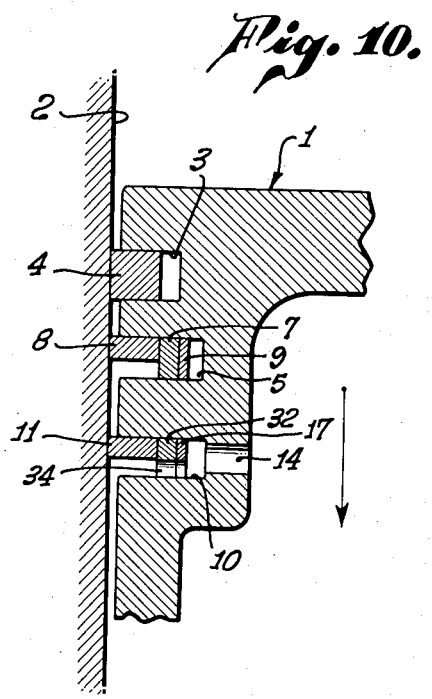
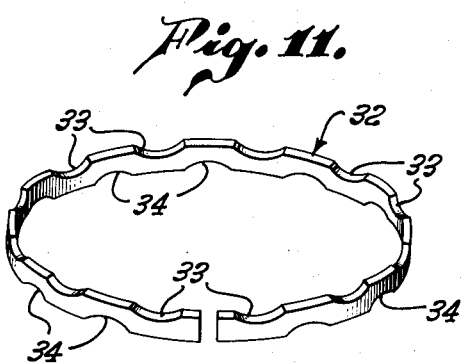
FRED ERNEST,
INVENTOR.
BY John Flam
ATTORNEY.

United States Patent Office 2,719,767
Patented Oct. 4, 1955

2,719,767

PISTON RING STRUCTURE

Fred Ernest, Los Angeles, Calif., assignor to
Guy H. Hall, Los Angeles, Calif.

Application April 12, 1952, Serial No. 281,980

6 Claims. (Cl. 309—7)

This invention relates to piston ring structures, particularly adapted for use in internal combustion engines. These rings serve to provide a seal between a piston and the wall of the cylinder in which the piston operates.

This application is a continuation-in-part of an application filed in the name of Fred Ernest on May 10, 1946, under Serial Number 668,860, and entitled Piston Ring, now Patent No. 2,602,010 issued July 1, 1952.

It is known to provide pistons, such as are employed in internal combustion engines, or the like, with a plurality of sealing rings for the purpose of preventing escape of the combustible mixture between the cylinder wall and the piston, as well as to prevent passage of excessive quantities of lubricating oil past the piston into the combustion chamber. However, in general, such rings do not have any special cooperation other than what may be termed a cumulative effect, each of the compression rings serving to prevent "blow by" and to limit the passage of oil independently of the other rings, while the oil ring operates independently to return most of the oil from the cylinder wall to the crank case.

It is an object of this invention to provide a piston ring structure which effects these functions.

It is another object of this invention to provide an improved oil ring structure arranged in such a way that, during the compression stroke, the excess oil in the cylinder space is readily forced past the ring structure through ports in the skirt of the piston and, during the suction stroke, oil is prevented from entering the cylinder space.

It is another object of this invention to provide an improved piston which may be equally as well used with conventional rings.

This invention possesses many other advantages, and has other objects which may be made more clearly apparent from a consideration of several embodiments of the invention. For this purpose, there are shown a few forms in the drawings accompanying and forming part of the present specification. These forms will now be described in detail, illustrating the general principles of the invention; but it is to be understood that this detail description is not to be taken in a limiting sense, since the scope of this invention is best defined by the appended claims.

Referring to the drawings:

Fig. 6 is a sectional view, similar to Fig. 1, of a modified form of the invention, the section being taken along a plane corresponding to line 6—6 of Fig. 7;

Fig. 7 is an enlarged fragmentary sectional view, taken along a plane corresponding to line 7—7 of Fig. 6, the piston operating on its compression stroke;

Fig. 8 is a view similar to Fig. 7, but illustrating the piston on its suction stroke;

Figure 1:
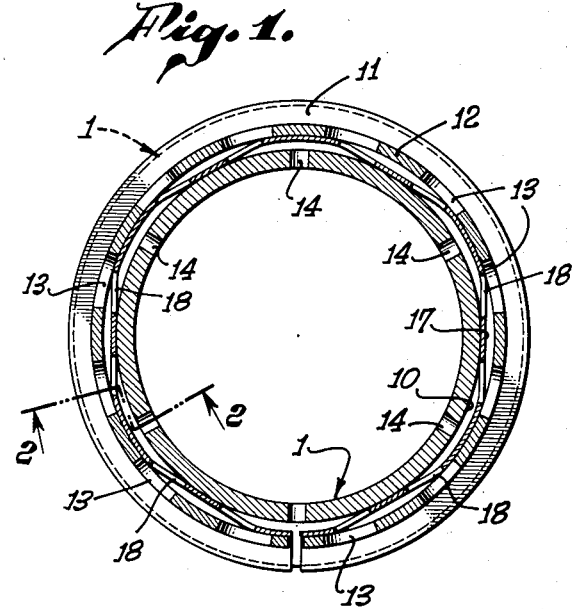
Figure 1 is a sectional view of a piston in which ring structures utilizing the invention are incorporated and taken along a plane corresponding to line 1—1 of Fig. 2.
Figure 2:
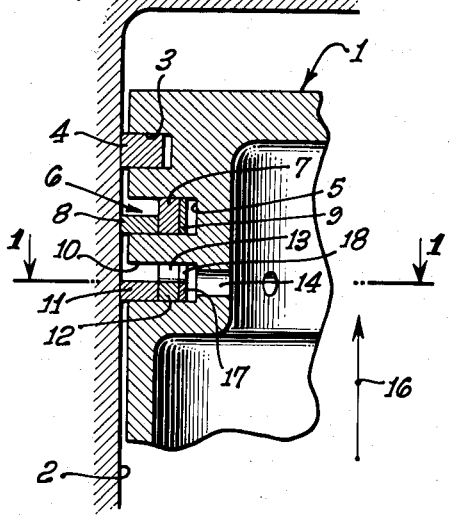
Fig. 2 is a fragmentary, enlarged transverse section of a piston utilizing rings embodying the features of the invention, taken as indicated by line 2—2 of Fig. 1, the piston being shown as operating on its compression stroke.
Figure 4:
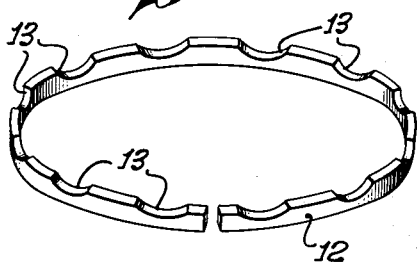
Fig. 4 is a pictorial view of one of the sealing rings utilized in the ring structure.
Figure 3:
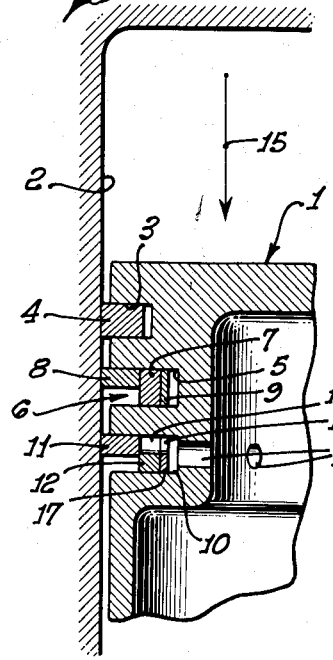
Fig. 3 is a view similar to Fig. 1, but illustrating the piston on its suction stroke.
Figure 5:
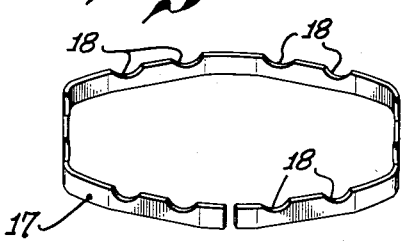
Fig. 5 is a pictorial view of an expander ring that may be utilized with the invention.

Figs. 9 and 10 are views, similar to Figs. 2 and 3, of a further modification; and Fig. 11 is a pictorial view of the sealing ring used in the form of the invention shown in Figs. 9 and 10.

Referring to Figs. 1 to 5 of the drawing, a piston 1 is indicated, and a portion of the cooperating cylinder wall 2 is shown. Near its upper end, the piston 1 is provided with a groove 3 accommodating a conventional compression ring 4. A second groove 5 is provided below the groove 3 for accommodating a compression ring structure 6 of novel form. This structure comprises an inner or seal ring 7, and an outer ring 8. The inner ring 7 is a split ring formed of steel, cast iron, or a suitable alloy, and has concentric inner and outer surfaces, as well as parallel upper and lower faces.

These faces contact the opposite sides or lands of the groove 5 in order to form a fluid-tight seal. The outer ring 8 is also a split ring with concentric inner and outer surfaces. The inner surface forms a fluid-tight seal with ring 7. The outer surface contacts the cylinder wall 2. This ring 8 may be formed of steel, bronze, cast iron, or other suitable material. It has a thickness substantially less than the width of the groove 5 by at least one-half of the extent of the groove 5. Rings 7 and 8 cooperate to form a complete seal, since ring 7, as above stated, seals against opposite lands of the groove 5, and ring 8 against the cylinder surface 2 and the outer surface of ring 7.

Due to the resilient engagement of ring 8 with the cylinder wall 2, the ring 8 traverses the groove 5 when the direction of movement of the piston 1 reverses at the end of the stroke. A spring expander 9 may be provided within the inner ring 7 for urging rings 7 and 8 radially outwardly into sealing relation, so as to provide the seal between the ring 8 and cylinder 2.

Another ring groove 10 is provided in the piston 1 below the groove 5 for accommodating an oil control ring 11. This ring 11 is a split ring with concentric inner and outer surfaces, and having a thickness substantially equal to, but not less than, one-half the width of the groove 10, to ensure against overlapping of the end portions of the ring. As before, the ring 11 may be formed of cast iron, steel, or other suitable alloy; and, by its resilient engagement with the cylinder wall 2, it is caused to traverse the groove 10 when the direction of movement of the piston is reversed. The groove 10 is vented to the interior of the piston, as by vents or ports 14, the venting being controlled by the ring 11.

Within the ring 11 there is an inner or seal ring 12. This seal ring has the same general proportions as the ring 7. However, as shown most clearly in Fig. 4, it is provided with a series of recesses or vents 13 at its upper edge. These recesses 13 are sufficiently shallow so that the inner edge of ring 11 may completely close or cover these vents when the piston 1 is moving downwardly on its suction stroke, and as illustrated by the arrow 15 of Fig. 3. On the compression stroke, when the piston 1 is moving upwardly, as indicated by the arrow 16 of Fig. 2, these vents or ports 13 are uncovered and in communication with the narrow clearance between the piston 1 and the cylinder wall 2.

The polygonal expansion ring 17, utilized back of the sealing ring 12 (Fig. 5), is also provided with a series of vents 18. These vents permit flow of oil radially inwardly past both the rings 12 and 17 when the piston 1 is moving upwardly as indicated in Fig. 2.

Accordingly, during the upward or compression stroke of the piston 1, the pressure in the space above the piston 1 serves to urge the oil past the rings 4 and 8 and through the vents 13 and 18 into the openings 14, to the interior of the piston 1. High pressure thus serves to blow the surplus oil back into the crank case against the atmospheric pressure existing within the piston 1.

When the piston 1 is moving downwardly, corresponding to the suction stroke, vents 13 and 18 are closed by the ring 11, and flow of oil outwardly through the ports or bleed holes 14 is prevented.

In this form of the invention, the outer rings 8 and 11 remain in contact at all times with the cylinder wall 2. Accordingly, upon any minor misplacement of the axis of piston 1 with respect to the axis of the cylinder wall 2, the rings 8 and 11 may cock slightly to remain in accurate sealing contact with the wall 2. This may also occur if the cylinder wall 2 is somewhat worn. However, the sealing rings 7 and 12 are not permitted to cock, and remain in proper sealing relationship with the walls of the piston ring grooves 5 and 10.

In the form shown in Figs. 6, 7, and 8, the piston 19 has a structure corresponding to that described and claimed in an application, Ser. No. 242,881, filed on July 23, 1951, in the name of Fred Ernest, and entitled Piston, and now abandoned. This piston structure is provided with a series of inwardly directed projections 20. The lowermost piston groove 21 extends inwardly beyond the wall 22 of the piston 19, and partially into projections 20. Accordingly, the groove 21 is in communication with the interior of the piston 19 by way of the spaces between the projections 20, as clearly indicated in Fig. 6.

The compression ring 23 is constructed in a manner similar to the compression ring 4 of the form shown in Figs. 2 and 3.

Furthermore, the intermediate pressure ring 24, with the sealing ring 25 and expander 26, are of similar structure to the ring 8, sealing ring 7, and expander 9 of the first form described, and operates in a similar manner.

In the piston groove 21, the outer ring 27 is similar to the ring 24. The sealing ring 28 is similar to the sealing ring 12. The expander ring 29 is shown to best advantage in Fig. 6, and is shown as generally polygonal and engaging the bottom of the groove 21 at alternate projections 20, and as engaging the inner side of the vented sealing ring 28. Insofar as the expander ring is concerned, it is described in the said prior application Ser. No. 242,881.

Since the sealing ring 28 is provided with a plurality of vents 30, the mode of operation of this form of the invention is substantially similar to that shown in Figs. 1 to 5.

The sealing ring 12 of the first form, and the sealing ring 28 of the second form as thus far described, include vents, such as 13 and 30, to permit the passage of excess oil into the interior of the pistons 1 or 19 when the piston is moving in a direction corresponding to a compression stroke. This movement is indicated by the arrow 16 of Fig. 2 and the arrow 31 of Fig. 7.

However, it is possible to provide a form in which the vents are opened for both the compression and suction strokes. Such a form of sealing ring is illustrated in Fig. 11. Here, the seal ring 32 is provided with vents 33 in the upper edge, and the vents 34 in its lower edge. Figs. 9 and 10 illustrate this ring cooperating with the annular ring 11 of piston 1. The arrow 35 of Fig. 9 indicates that the piston 1 is traveling in a direction corresponding to a compression stroke. In that event, the vents 33 are active to pass excess oil through the bleed hole 14.

In Fig. 10, the piston 1 is traveling in a direction corresponding to a suction stroke. In this case, the lower vents 34 are open, and oil can pass through the port 14 from below the ring 11.

Furthermore, it may be desirable at times to include only the vents 34, omitting the upper vents 33. In such an event, the sealing ring 32 operates only to permit free passage of the oil inwardly or outwardly of the port 14 when the piston is on its suction stroke.

The inventor claims:

1. In a structure for sealing between a piston and a cooperating cylinder wall: a ring structure adapted to be accommodated in a groove in the piston, said groove having one or more bleed holes to the interior of the piston, and opening in the bottom of the groove, said ring structure including a ring member movable axially of the groove, said ring member having an axial width substantially less than the groove and sealing against the cylinder wall; and a seal ring extending completely across the groove for sealing between the inside of said ring member and the groove, said seal ring having one or more vents adjacent an edge, which vents are alternately covered and uncovered by the ring member in accordance with the direction of motion of the piston.

2. In a structure for sealing between a piston and a cooperating cylinder wall: a ring structure adapted to be accommodated in a groove in the piston, said groove having one or more bleed holes to the interior of the piston, said ring structure including a ring member movable axially of the groove, said ring member having an axial width substantially less than the groove and sealing against the cylinder wall; and a seal ring extending completely across the groove for sealing between the inside of said ring member and the groove, said seal ring having one or more vents adjacent each of the opposite edges, which vents are alternately covered and uncovered by the ring member in accordance with the direction of motion of the piston.

3. In an oil control device: a piston having a plurality of angularly spaced inwardly opening recesses disposed in the ring belt of the piston; there being a ring groove encircling the piston and in direct communication with said recesses; a ring disposed in said groove having a surface resiliently sealing against the cylinder and of substantially less thickness than the width of said groove, said ring being freely movable axially across the groove upon reversal of the piston movement; and a seal ring extending completely across the groove for sealing between the inside of said ring member and the groove, said seal ring having one or more vents adjacent an edge, which vents are alternately covered and uncovered by the ring member in accordance with the direction of motion of the piston.

4. In an oil control device: a piston having a plurality of angularly spaced inwardly opening recesses disposed in the ring belt of the piston; there being a ring groove encircling the piston and in direct communication with said recesses; a ring disposed in said groove having a surface resiliently sealing against the cylinder and of substantially less thickness than the width of said groove, said ring being freely movable axially across the groove upon reversal of the piston movement; and a seal ring extending completely across the groove for sealing between the inside of said ring member and the groove, said seal ring having one or more vents adjacent each of the opposite edges, which vents are alternately covered and uncovered by the ring member in accordance with the direction of motion of the piston.

5. In a ring structure adapted to be accommodated in a piston groove: an inner ring sealing against the opposite sides of the groove; and an outer ring having a thickness substantially less than the clearance between the opposite sides of the groove and in sealing relation to the concentric annular surfaces of the cylinder wall and the said inner ring; said inner ring having one or more vents adjacent an edge, which vents are alternately covered and uncovered by the outer ring in accordance with the direction of movement of the piston.

6. In a ring structure adapted to be accommodated in a piston groove: an inner ring sealing against the opposite sides of the groove; and an outer ring having a thickness substantially less than the clearance between the opposite sides of the groove and in sealing relation to the concentric annular surfaces of the cylinder wall and the said inner ring; said inner ring having one or more vents adjacent each of the opposite edges, which vents are alternately covered and uncovered by the outer ring in accordance with the direction of motion of the piston.

References Cited in the file of this patent

UNITED STATES PATENTS

| | | |
|---|---|---|
| 1,304,360 | Norwood | May 20, 1919 |
| 1,738,534 | Johnson | Dec. 10, 1929 |
| 1,796,792 | Johnson | Mar. 17, 1931 |
| 2,356,909 | Aske | Aug. 29, 1944 |
| 2,396,018 | Mis | Mar. 5, 1946 |
| 2,653,065 | Appleton | Sept. 22, 1953 |